United States Patent [19]

McCarron, III et al.

[11] Patent Number: 5,055,441
[45] Date of Patent: Oct. 8, 1991

[54] PROCESS FOR PREPARATION OF METAL OXIDES OF MOLYBDENUM OR MLYBDENUM AND TUNGSTEN

[75] Inventors: Eugene M. McCarron, III, Greenville, Del.; John B. Parise, East Setauket, N.Y.

[73] Assignee: E. I. du Pont de Nemours and Company, Wilmington, Del.

[21] Appl. No.: 473,543

[22] Filed: Feb. 1, 1990

[51] Int. Cl.$^5$ .................... B01J 23/28; C01G 39/00
[52] U.S. Cl. .................... 502/321; 423/593
[58] Field of Search ............ 502/321, 305; 423/58 X, 423/55 X, 606 X, 61 X, 593 X, 440

[56] References Cited

U.S. PATENT DOCUMENTS 3,902,917  9/1975  Baresel et al. ............... 423/440 X
3,929,670 12/1975  Kudo et al. ................. 502/241 X
4,753,916  6/1988  Carcia et al. ................ 502/321

FOREIGN PATENT DOCUMENTS 56-166311 12/1981 Japan.
56-169115 12/1981 Japan.
62-037682  8/1987 Japan.

OTHER PUBLICATIONS

McCarron, J. Chem. Soc., Chem. Commun., pp. 336–338 (1986).
Battenx et al., "Preparation and Pecularities of Freeze Dried Materials", Prog. Ref. Sci. Tech., vol. 3, pp. 611–616 (1973).
Kirk Othmer Encyclopedia of Chemical Technology, vol. 6, pp. 524–525 (2nd ed., 1965).
A. B. Kiss et al., Acta Chim. Acad. Sci. Hung 66(3)235 (1970).
L. Kihlborg, Arkiv for Kemi 21 (34), 357 (1963).
Harb et al., Solid State Ionics 32/33 (1989) 84–90.
Svensson et al., Reactivity of Solids, 3(1987) 33–43.

*Primary Examiner*—W. J. Shine
*Assistant Examiner*—Douglas J. McGinty

[57] ABSTRACT

A beta phase of molybdenum trioxide or the mixed metal oxides of molybdenum and tungsten is prepared by spray-freezing then freeze-drying, affording a powder which is then heated to a temperature of 275° C. to 450° C.

2 Claims, No Drawings

PROCESS FOR PREPARATION OF METAL OXIDES OF MOLYBDENUM OR MLYBDENUM AND TUNGSTEN

BACKGROUND OF THE INVENTION

This invention relates to an improved process for the preparation of a beta phase of molybdenum trioxide or the isostructural mixed metal oxides of molybdenum and tungsten.

Molybdenum trioxide (alpha) is known to crystallize with a two dimensional structure, which has been described as a layered structure, $MoO_{1/1}O_{2/2}O_{3/3}$, or as a chain structure, $MoO_{2/1}O_{2/2}$. Tungsten trioxide is known to adopt a $ReO_3$-related structure, $WO_{6/2}$. The dissimilar structure of alpha $MoO_3$ is believed to be caused by the formation of oxomolybdenum cations which stabilize the layered structure. Novel phases of molybdenum trioxide and mixed metal-oxides of molybdenum and tungsten and methods for their preparation are of interest to the chemical industry.

U.S. Pat. No. 4,753,916 discloses methods for preparing a composition of matter comprising $\beta\text{-}Mo_{1-x}W_xO_3$, wherein $0 \leq x < 1.0$. One method of the invention comprises spray-drying a solution of molybdic acid or molybdic and tungstic acids in appropriate concentrations and heating the resulting powder to a temperature of about 275° C. to about 450° C.

U.S. Pat. No. 4,753,916 also describes the properties and the utilities of these beta phase materials. The disclosures of this patent are hereby incorporated by reference.

SUMMARY OF THE INVENTION

This invention provides an improved method for preparing the composition of matter of U.S. Pat. No. 4,753,916, i.e., $\beta\text{-}Mo_{1-x}W_xO_3$, wherein $0 \leq x < 1.0$. The method of the invention comprises spray-freezing a solution of molybdic acid or molybdic and tungstic acids in appropriate concentrations to form a solidified material, freeze-drying the material to produce a powder, and heating the resulting powder to a temperature of about 275° C. to about 450° C., preferably about 275°. C. to 325° C.

DETAILS OF THE INVENTION

It has been found that aqueous molybdic acid and mixtures thereof with tungstic acid can be converted, in a spray-freezing and freeze-drying process, to amorphous powders of the formula, $H_2Mo_{1-x}W_xO_4 \cdot 3/2 H_2O$ wherein $0 \leq x < 1.0$. Thermal treatment of the amorphous powders affords the three-dimensional phase of the specified metal or mixed-metal oxides, designated "beta" or "$\beta$" herein. Differences in physical characteristics of "beta" and "alpha"-phase crystals make the two materials easily discernible. The compositions are useful as catalysts for the selective oxidation of methanol to formaldehyde. The specified compositions have further utility in the photochromism (yellow→blue→black) produced by conversion of the "beta" phase to a hydrogen or lithium intercalate for electrochromic display devices.

The starting solutions and their concentrations are the same as used in the prior art, i.e., as disclosed in U.S. Pat. No. 4,753,916.

The starting solution is then subjected to a conventional spray-freezing step to form a solidified material. Thus, for example, the solution can be sprayed into liquid nitrogen.

The solidified material from the spray freezing step is then freeze dried to form a powder. This process is also well known and can be accomplished by using a conventional freeze-drier, e.g., such as described in "Advances in the Modeling and Control of Freeze Drying", A. I. Liapis.

The powder from the freeze drying step is then heated to a temperature of 275° C. to 450° C., preferably 275° C. to 325° C. as described in U.S. Pat. No. 4,753,916, to form the desired product by exothermal crystallization of the amorphous powder.

The process of freeze drying molybdic acid to produce beta-$MoO_3$ represents an improvement over the spray drying process of the art in that the low temperatures associated with freeze drying avoid the formation of the thermodynamically stable alpha phase of $MoO_3$, whereas the much higher temperatures associated with spray drying can lead to an appreciable alpha content. Secondly, the surface area of the freeze dried powder is an order of magnitude greater than that of the spray dried powder (14.1 m$^2$/g versus 1.3 m$^2$/g), which can be of considerable interest with respect to catalytic applications.

EXAMPLE

An aqueous solution of $Na_2MoO_4 \cdot 2H_2O$ (25 grams in 100 mls. (~1 M); pH ~9) was passed through a cation exchange column loaded with 500 grams of a resin commercially available from Fischer Scientific under the registered trademark Rexyn 101 (H). In addition to the pH, the sodium content of the effluent from the column was monitored with a sodium responsive electrode. The pH of the final solution was determined to be about 1.7 and the sodium content less than $10^{-3}$ M.

The molybdic acid solution was then "spray-frozen" by aspirating the solution directly into a liquid nitrogen bath. This was accomplished by spraying the solution through an air atomization nozzle into a covered beaker containing liquid nitrogen. The nozzle manufactured by Spraying Systems Co., Wheaton, Illinois, was Model 9265-1/4 J-LUC fitted with fluid cap #2850-LUC, liquid orifice diameter of 0.7 mm (0.028 in) and air cap #70-LUC. The nozzle was pressurized by 140 KPa (20 psi) of air. The resulting solidified material of liquid nitrogen and finely divided powder was then freeze dried. The freeze drying process was accomplished by transferring the solidified material to a commercial freeze drying apparatus.

The resultant molybdic acid was a freely flowing powder having a pale greenish tint. The composition of the powder was determined to be $H_2MoO_4 \cdot 3/2 H_2O$ by chemical analysis for molybdenum and thermogravimetric analysis for $H_2O$ (56.0 wt. % Mo; 15.7 wt. % $H_2O$; 0 by difference). Additionally the freeze dried molybdic acid was found to dissolve exothermally in water and to be amorphous to x-rays. Heat treatment (300° C. for 1 hour in oxygen) of this amorphous molybdic acid produced crystalline beta-$MoO_3$. Beta-$MoO_3$ is easily distinguished from the well known alpha phase by its yellow color, which is similar to that of structurally related $WO_3$. The structure of beta-$MoO_3$ was determined and found to be a monoclinically distorted derivative (space group $P2_1/c$) of rhenium trioxide ($ReO_3$) with the following lattice parameters: a=0.71223(4)nm; b=0.53660(4)nm; c=0.55658(4)nm; beta=91.982(5)°.

What is claimed is:

1. A method for preparing a composition of matter comprising beta-$Mo_{1-x}W_xO_3$, wherein $0 \leq x < 1.0$, comprising spray-freezing a solution of molybdic acid or molybdic and tungstic acids in appropriate concentrations to form a solidified material, freeze-drying the material to produce a powder, and heating the resulting powder to a temperature of about 275° C. to about 450° C.

2. A method as defined in Claim 1, wherein the temperature is about 275° C. to about 325° C.